(12) United States Patent
Miki et al.

(10) Patent No.: US 7,173,932 B2
(45) Date of Patent: Feb. 6, 2007

(54) PACKET SWITCHING APPARATUS

(75) Inventors: Kazuho Miki, Kawasaki (JP); Kenichi Sakamoto, Kokubunji (JP); Koji Wakayama, Kokubunji (JP); Tetsuhiko Hirata, Yokohama (JP); Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 858 days.

(21) Appl. No.: 09/924,768

(22) Filed: Aug. 9, 2001

(65) Prior Publication Data

US 2002/0176414 A1 Nov. 28, 2002

(30) Foreign Application Priority Data

May 28, 2001 (JP) ............................. 2001-158108

(51) Int. Cl.
*H04L 12/28* (2006.01)

(52) U.S. Cl. .................... 370/389; 370/351; 370/401

(58) Field of Classification Search ............... 370/389, 370/401, 338, 351–356, 465, 466, 331, 392
See application file for complete search history.

(56) References Cited

U.S. PATENT DOCUMENTS

| | | | | |
|---|---|---|---|---|
| 6,151,628 A * | 11/2000 | Xu et al. | ..................... | 709/225 |
| 6,178,455 B1 * | 1/2001 | Schutte et al. | .............. | 709/228 |
| 6,233,234 B1 * | 5/2001 | Curry et al. | ................ | 370/356 |
| 6,341,127 B1 * | 1/2002 | Katsube et al. | ............ | 370/352 |
| 6,452,920 B1 * | 9/2002 | Comstock | ................... | 370/349 |
| 6,574,224 B1 * | 6/2003 | Brueckheimer et al. | . | 370/395.6 |
| 6,640,248 B1 * | 10/2003 | Jorgensen | ................... | 709/226 |
| 6,665,718 B1 * | 12/2003 | Chuah et al. | ............... | 709/225 |
| 6,667,984 B1 * | 12/2003 | Chao et al. | ................. | 370/414 |
| 6,683,885 B1 * | 1/2004 | Sugai et al. | ................ | 370/423 |

(Continued)

FOREIGN PATENT DOCUMENTS

JP 2000-261457 3/1999

OTHER PUBLICATIONS

W. Simpson, Editor, "Memo to Network Working Group re: the Point-to-Point Protocol (PPP)," Jul. 1994 Daydreamer, pp. 1-46.

(Continued)

*Primary Examiner*—Ricky Q. Ngo
*Assistant Examiner*—Andrew C. Lee
(74) *Attorney, Agent, or Firm*—Reed Smith LLP; Stanley P. Fisher, Esq.; Juan Carlos A. Marquez, Esq.

(57) ABSTRACT

An access node run as a packet switching apparatus enables IP connection services for a plurality of access methods; e.g., relatively low-speed IP connection, high-speed IP connection, and mobile network IP connection. By using this apparatus of the present invention, cost can be reduced and upgrading to advanced access networks and access services is easily carried out. Provision of the above access nodes implements upgrade-type network services common for diverse protocols. Each access node retains a pathfinding table to which input port, input tunnel identifier and input session identifier entries in a set are registered per session. When routing a packet, by looking up the set of these entries matching with the packet, the associated output port, output tunnel identifier, and output session identifier are obtained. After processing for the packet, appropriate for one of the plurality of access methods and network services, the node forwards the packet over the routed path.

4 Claims, 21 Drawing Sheets

U.S. PATENT DOCUMENTS 6,763,018 B1 * 7/2004 Puthiyandyil et al. ...... 370/352
6,850,531 B1 * 2/2005 Rao et al. ................... 370/401
6,862,622 B2 * 3/2005 Jorgensen ................... 709/226
6,954,463 B1 * 10/2005 Ma et al. .................... 370/401

OTHER PUBLICATIONS

W. Townsley, A. Valencia, A. Rubens, G. Pail, G.Zorn, B. Palter, "Memo to Network Working Group re: Layer Two Tunneling Protocol (L2TP)," Aug. 1999, pp. 1-69.

* cited by examiner

| PPP SESSION | INPUT INFORMATION | | | OUTPUT INFORMATION | | | |
|---|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER | |
| PS 1 | 32 | – | 1 | 51 | TL11 | 1 | 111 |
| PS 2 | 31 | – | 1 | 51 | TL11 | 2 | 112 |
| PS 3 | 33 | TL15 | 1 | 51 | TL11 | 3 | 113 |
| PS 4 | 34 | TL16 | 1 | 51 | TL11 | 3 | 114 |
| | IN11 | IN12 | IN13 | OUT11 | OUT12 | OUT13 | |

IN1 / OUT1

| PPP SESSION | INPUT INFORMATION | | | OUTPUT INFORMATION | | | |
|---|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER | |
| PS 1 | 31 | TL11 | 1 | 51 | – | – | 121 |
| PS 2 | 31 | TL11 | 2 | 51 | – | – | 122 |
| PS 3,4 | 31 | TL11 | 3 | 51 | – | – | 123 |
| | IN21 | IN22 | IN23 | OUT21 | OUT22 | OUT23 | |

IN2 / OUT2

| PPP SESSION | INPUT INFORMATION ||| OUTPUT INFORMATION |||
|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER |
| PS 5 | 31 | TL17 | 1 | 51 | TL13 | 1 |

IN3 / OUT3
IN31, IN32, IN33, OUT31, OUT32, OUT33
131

| PPP SESSION | INPUT INFORMATION ||| OUTPUT INFORMATION |||
|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER |
| PS 1 | 31 | TL11 | 1 | 51 | – | – |
| PS 2 | 31 | TL11 | 2 | 51 | – | – |
| PS 5 | 31 | TL13 | 1 | 51 | – | – |

IN4 / OUT4
IN41, IN42, IN43, OUT41, OUT42, OUT43
141, 142, 143

| PPP SESSION | INPUT INFORMATION | | | OUTPUT INFORMATION | | | |
|---|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER | |
| PS 6 | 32 | – | 2 | 51 | TL18 | 1 | ~151 |
| PS 7 | 31 | – | 2 | 51 | TL19 | 1 | ~152 |

IN5 spans the INPUT INFORMATION columns (IN51, IN52, IN53); OUT5 spans the OUTPUT INFORMATION columns (OUT51, OUT52, OUT53).

| PPP SESSION | INPUT INFORMATION | | | OUTPUT INFORMATION | | | |
|---|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER | |
| PS 6 | 31 | TL18 | 1 | 51 | – | – | ~161 |
| PS 7 | 31 | TL19 | 1 | 52 | – | – | ~162 |

IN6 spans the INPUT INFORMATION columns (IN61, IN62, IN63); OUT6 spans the OUTPUT INFORMATION columns (OUT61, OUT62, OUT63).

FIG. 19

| PPP SESSION | INPUT INFORMATION (IN7) ||| OUTPUT INFORMATION (OUT7) |||
|---|---|---|---|---|---|---|
| | INPUT PORT | INPUT TUNNEL IDENTIFIER | INPUT SESSION IDENTIFIER | OUTPUT PORT | OUTPUT TUNNEL IDENTIFIER | OUTPUT SESSION IDENTIFIER |
| PS 8 | 32 | – | 1 | 51 | – | – |
| PS 9 | 31 | – | 1 | 52 | – | – |
| | IN71 | IN72 | IN73 | OUT71 | OUT72 | OUT73 |

170, 171, 172

PACKET SWITCHING APPARATUS

BACKGROUND OF THE INVENTION

1. Field of the Invention

The present invention relates to access nodes accommodating a plurality of access methods.

2. Description of Related Art

Over IP networks, typically, the Internet, data is transmitted in compliance with the Internet Protocol (IP) As a service of allowing users to gain access to such IP network, an Internet service is available. Common carriers offering the Internet service are called Internet Service Providers (ISPs). As means of access from a user to an ISP, a Point to Point Protocol (PPP), which has been standardized as Request for Comments (RFC) 1661 by the Internet Engineering Task Force (IETF), is often used. Moreover, an IP connection service is known as the service of relaying a plurality of access requests from users to an ISP. Common carriers offering the IP connection service are called carriers or access providers and they may connect and allocate PPP-compliant access requests from users to an ISP by tunneling. A typical tunneling protocol example is Layer 2 Tunneling Protocol (L2TP) specified in RFC2661.

FIG. 20 shows a illustrative topology organized with networks for implementing a high-speed IP connection service, the conventional high-speed IP connection service in an access method using Digital Subscriber Lines (DSLs), which are typically Asymmetric Digital Subscriber Line (ADSL) . The kernel of the high-speed IP connection network comprises broadband access servers BSs that accept access requests from users, BSs that distribute the access requests to ISP networks, an access control server AC12 for controlling access, and a core network CN1, at the entrance of which the former BSs are located and at the exit of which the latter BSs are located. To this kernel, terminals and hosts such as servers are connected. The core network comprises transmission paths and IP routers. Now, take note of a broadband access server BS11. Upon receiving a PPP connection request transferred across a DSL network MN11 which is an access media network and a DSL Access Multiplexer (DSLAM) DL11 from a user IP terminal IT20, the server BS11 queries the access control server AC12 about routing the request and routes it to an ISP network PN11. If there does not exist an L2TP tunnel TL22 for relaying the request to a broadband access server BS13 connecting to the PN11, the broadband access server BS11 issues a request to set up this tunnel. The BS13 queries an access control server AC13 for the PN11 about whether the user who issued the PPP connection request is an authorized user under contract. If the user authentication is verified, an L2TP session is set up between the BS11 and BS13 across the TL22. PPP session PS 10 is established in this way as indicated by a bold broken line from the IT20 to the BS13, and the IT20 is then connected to the Internet over the PN11 in the high-speed IP connection mode. In FIG. 20, over the section from the BS13 to the Internet, distinguished by a finer broken line, PPP is no longer used and IP transmission is performed. In FIG. 20, the access control servers AC12 and AC13 are also called Radius servers. In the case of L2TP, the control of the AC12 may be called primary authentication and the control of the AC13 secondary authentication. The BS12 and BS13 are called Broad Access Servers (BASs). In the case of L2TP, functionally, the BS11 is called an L2TP Access Concentrator (LAC) and the BS12 an L2TP Network Server (LNS).

FIG. 21 shows an illustrative topology organized with networks for implementing a relatively low-speed IP connection service, the conventional relatively low-speed IP connection service in an access method using telephone networks. Unlike the high-speed IP connection service, in the relatively low-speed IP connection service mode, a terminal IT 22 initially attempts a call for connection request by dial-up. When a switch SW11 receives the attempted call transmitted over the telephone network MN11 which is an access media network, it transfers the call to an access control server AC11 across a telephone control network MN10 and the server AC11 activates the access server AS11. Then, after the AS11 receives a PPP connection request form the IT22, routing the request is performed by following the same procedure described for FIG. 20, and eventually an L2TP tunnel TL26 and a PPP session PS11 are set up. Then, the IT22 is connected to the Internet via the PN11 in the relatively low-speed IP connection mode. As the telephone control network MN10 in FIG. 21, a common channel signaling network such as SS7 is often used. The access control server AC11 is also called a Signaling Gateway. The access servers AS11 and AS13 are also called Remote Access Servers (RASs) and functionally the AS11 is called the LAC and the AS13 is called the LNS.

FIG. 22 shows a illustrative topology organized with networks for implementing a mobile network IP connection service, the conventional mobile network IP connection service in an access method using a mobile network such as radio channels. Unlike the high-speed or relatively low-speed IP connection service, in the mobile IP connection service mode, a mobile node MoN11 initially receives a connection request from a terminal IT 24 transmitted over a mobile network MN13 which is an access media network. A tunnel TL 34 from the MoN11 to a mobile access node MA11 is set up by using Generic Routing Encapsulation (GRE) or the like. After that, routing the request is performed by following the same procedure described for FIG. 20 and eventually an L2TP tunnel or Mobile IP tunnel 31 and a PPP session PS 12 are set up. Then, the IT24 is connected to the Internet over the PN11 in the mobile network IP connection mode. As the IT 24 moves, the tunnel between the MA11 and MA13 is removed and another tunnel is set up accordingly so that offering of the IP connection service continues even if the user moves. Diverse types of the mobile network MN 13 shown in FIG. 22 are available; e.g., General Packet Radio Service (GPRS) network, IMT2000 network, High Data Rate (HDR) network, etc. Diverse types of the mobile node MoN11 are available; e.g., Packet Control Function (PCF), Access Point (AP), etc. Diverse types of the mobile access node MA13 are available; e.g., Home Agent (HA), Gateway GPRS Support Node (GGSN), etc.

FIG. 23 shows an illustrative hardware configuration of a conventional high-speed IP router. The high-speed IP router, shown in FIG. 23, has line interface units and IP processing units on the input and output sides and a switch unit connects both sides. Its control unit has control over the router and its components. Because the IP processing units perform high-speed processing only for forwarding packets in compliance with the IP protocol, using ASIC or the like, generally, the router is not engaged in the above-described session and tunnel setup based on PPP, L2TP, etc. required for IP connection services.

FIG. 24 shows an illustrative hardware configuration of a conventional PAS. The RAS, shown in FIG. 24, has line interface units and modem and HDLC processing units on the input and output sides and a bus or switch unit connect both sides. Its control unit has control over the RAS and its components and moreover, it is engaged in IP processing and session setup based on PPP, L2TP, etc., thus implementing the RAS function.

As described above, separate communications equipments have so far been required for different access methods; i.e., high-speed access servers for the network implementing the high-speed IP connection service, access servers for the network implementing the relatively low-speed IP connection service, and mobile access nodes for the network implementing the mobile network IP connection service. For example, if a common carrier that now offers the relatively low-speed IP connection service plans to offer the high-speed IP connection service, it has to procure new equipment of another type which costs a lot. Adding another type of equipment complicates the management. Such a problem was posed that the investment in the facilities would become vain if most users shifted from the relatively low-speed IP connection service to the high-speed IP connection service. The same is true for when the common carrier plans to offer the mobile network IP connection service in addition to the existing services. Partly due to that, inevitably, some carriers offer fixed network services only whereas other carriers offer mobile network services only.

To make an access server or node accommodate the plurality of access methods, a conceivable method is changing the software to run on the IP router that carries out software-controlled packet switching. However, the IP router for IP packet switching configured in hardware has lately been used to implement high-speed data packet transmission. The performance of the software-controlled IP packet switching is significantly lower than the performance of the high-speed IP router configured in hardware. Thus, the software-controlled processing does not serve practical high-speed packet switching needs, though it maybe acceptable for the RAS that carries out only the relatively low-speed IP connection. Another problem is that the RAS generally has STM line interfaces dedicated to the access over a telephone network and connection ports for connecting to an access control server and its structure is different from other access servers or nodes.

SUMMARY OF THE INVENTION

In accordance with the present invention, an access node accommodating a plurality of access methods can be provided.

To solve the above-described problems, the present invention is preferably embodied such that the access node which is run as a packet switch apparatus of the present invention retains a pathfinding table to which input port, input tunnel identifier and input session identifier entries in a set are registered as input information for a session when the session is set up. By looking up the input information, output information is obtained. All or part of these input entries may be set, according to the access method of the session. To the table, output port, output tunnel identifier, and output session identifier entries are simultaneously set as the output information associated with the input information for the session. All or part of these output entries may be set, according to the routing mode of the session. By setting common input versus output information per session for a plurality of access methods to the table, the access node can cope with a plurality of access methods and IP connection services, based on the same information. The configuration of the access node (packet switching apparatus) includes a plurality of types of line interfaces; each can be removed and installed freely. Moreover, the apparatus is provided with a connection port for connecting its control unit to an access control server so that it can cope with a different access method such as call control.

BRIEF DESCRIPTION OF THE DRAWINGS

FIG. 3 illustrates a table to contain input versus output information with exemplary entries, which is retained on an access node located on the user-terminal-toward side in Embodiment 1 of the invention.

FIG. 4 illustrates a table to contain input versus output information with exemplary entries, which is retained on an access node located on the Internet-toward side in Embodiment 1 of the invention.

FIG. 13 illustrates a table to contain input versus output information with exemplary entries, which is retained on an access node located on the user-terminal-toward side, to which the information for the session set up when a terminal moves such that it is handed over from an access node to another access node in the mobile network IP connection service mode in Embodiment 1 of the invention is set.

FIG. 14 illustrates a table to contain input versus output information with exemplary entries, which is retained on an access node located on the Internet-toward side, to which the information for the session set up when a terminal moves such that it is handed over from an access node to another access node in the mobile network IP connection service mode in Embodiment 1 of the invention is set.

FIG. 16 illustrates a table to contain input versus output information with exemplary entries, which is retained on an access node located on the user-terminal-toward side in Embodiment 2 of the invention.

FIG. 17 illustrates a table to contain input versus output information with exemplary entries, which is retained on an access node located on the Internet-toward side in Embodiment 2 of the invention.

FIG. 19 illustrates a table to contain input versus output information with exemplary entries, which is retained on an access node in Embodiment 3 of the invention.

DETAILED DESCRIPTION OF THE PREFERRED EMBODIMENTS

A preferred Embodiment 1 of the present invention will now be described with reference to the attached drawings.

Figure 1:
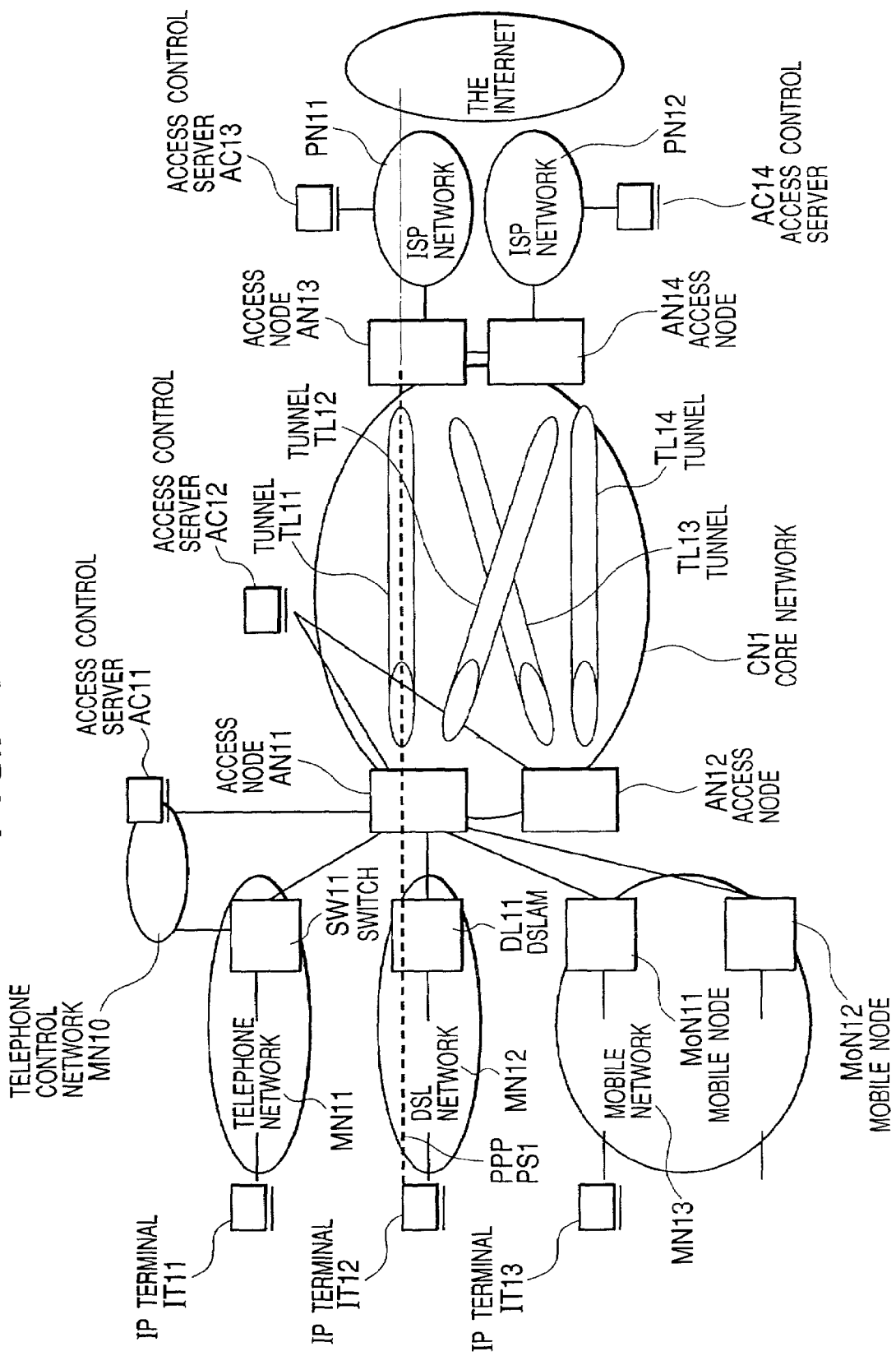
FIG. 1 shows an illustrative topology for a preferred Embodiment 1 of the present invention, organized with networks and access nodes including the networks respectively providing a relatively low-speed IP connection service, a high-speed IP connection service, and a mobile network IP connection service, wherein a session and tunnel for the high-speed IP connection service are specially marked.

FIG. 1 shows an illustrative topology for Embodiment 1, organized with networks and access nodes including the networks respectively providing a relatively low-speed IP connection service, a high-speed IP connection service, and a mobile network IP connection service. In this figure, an ellipse in the center represents the area of an IP core network CN1 across which data packets are transferred in compliance with IP. At the entrance and exit of the core network, access nodes AN11, AN12, AN13, and AN14 are located. Across the core network, between the entrance and exit access nodes, tunnels based on L2TP or the like, TL11 to TL14, are run. Moreover, IP routers, which are not shown, exist in the core network to forward tunneled packets. The IP routers are only required to be aware of only the IP level. If the tunnels are L2TP-based, the access nodes AN11 and AN12 function as the LACs and the access nodes AN13 and AN14 function as the LNSs. Outside the core network CN1, there are access media networks MN11 to MN13 which operate differently, based on different access methods, to which user IP terminals may connect. The access media networks respectively include a switch SW 11, DSLAM DL11, and mobile nodes Mon11 and Mon12, according to the access method, as network nodes connected to the access node AN11. On the opposite side of the core network, there are a plurality of ISP networks PN11 and PN12 connected to the Internet. Instead of the ISP networks, corporate networks may exist, which are regarded as the same.

Figure 2:
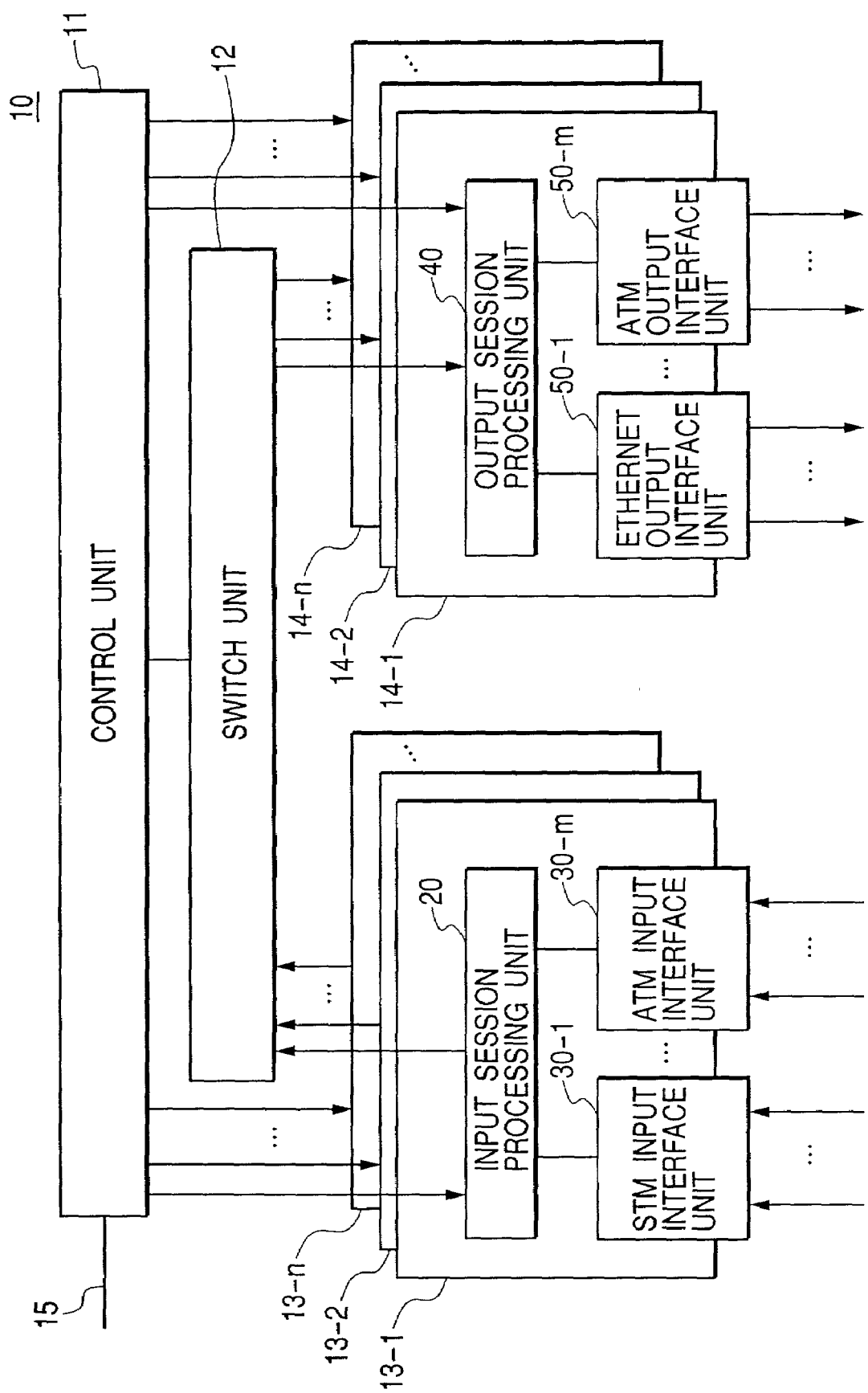
FIG. 2 is a diagram showing a configuration example of an access node for implementing Embodiment 1 of the invention.

For the above-mentioned access nodes AN11 (LAC) and AN13 (LNS), representative of the nodes accommodating a plurality of access methods, each node is run as a packet switching apparatus of the present invention which will be hereinafter referred to as an access node apparatus or simply an access node; its configuration example is shown in FIG. 2. The access node apparatus 10 shown in FIG. 2 comprises a control unit 11, a switch unit 12, a plurality of input processing units 13, and a plurality of output processing units 14. The input processing units 13 and the output processing units 14 may be separate hardware entities or may be integrated into a single hardware entity. The input processing units 13 are, in fact, a set of an input session processing unit 20 and a plurality of input interface units 30 for types of input lines. The output processing units 14 are, in fact, a set of an output session processing unit 40 and a plurality of output interface units 50 for types of output lines. For either side, similarly, the session processing unit and the line interface units may be integrated into a single hardware entity or separate hardware entities. The single entity and separate entities differ in respect of units in which flexible line type switchover is possible. These line interface units have a plurality of line ports and connect to another network equipment through an external transmission line that terminates at one of the ports. Data packets are input across the input interface units 30 and subjected to session processing in compliance with PPP or the like and IP processing in the input session processing unit 20. After subjected to tunnel processing in compliance with L2TP or the like, the packets are internally switched through the switch unit 12. Then, the packets are transferred to the output session processing unit 40, where they are again subjected to session processing in compliance with PPP or the like, IP processing, and tunnel processing in compliance with L2TP or the like, and output through the output interface units 50. With the input processing units 30 and the output processing units 40 integrated into a single hardware entity, if a packet is output to another line interface port connected to the same session processing unit, the packet may not pass through the switch unit 12. The control unit 11 connected to these input processing unit 13 and output processing unit 14 as well as the switch unit 13 and having control and management over them performs protocol signal processing for PPP, L2TP, etc. and call control related processing via a control line 15 if the apparatus is used as LAC.

The access node AN11 (LAC) retains a table 110 like the one shown in FIG. 3 in which a plurality of sessions for packet transmission based on PPP or the like can be registered. The table shown in FIG. 3 contains common data to be used for setting up a session in relatively low-speed IP connection mode, high-speed IP connection mode, or mobile network IP connection mode. Data elements to be contained in the table shown in FIG. 3 are input information IN1 entries of input port IN11, input tunnel identifier IN12, and input session identifier IN13 and output information OUT1 entries of output port OUT11, output tunnel identifier OUT12, and output session identifier OUT 13. The data elements in the table shown in FIG. 3 are arranged in relation between the input to and the output from the access node AN11 apparatus in a general view. In practice, the table may be divided into input and output parts such that these parts are respectively allotted to the input session processing unit 20 and the output session processing unit 40 shown in FIG. 2.

The access node AN 13 (LNS) retains a table 120 like the one shown in FIG. 4 in which a plurality of sessions for packet transmission based on PPP or the like can be registered. Similarly, the table shown in FIG. 4 contains common data to be used for setting up a session in relatively low-speed IP connection mode, high-speed IP connection mode, or mobile network IP connection mode. Data elements to be contained in the table shown in FIG. 4 are the same as those in the table shown in FIG. 3; i.e., input information IN2 entries of input port IN21, input tunnel identifier IN22, and input session identifier IN23 and output information OUT2 entries of output port OUT21, output tunnel identifier OUT22, and output session identifier OUT 23.

Figure 5:
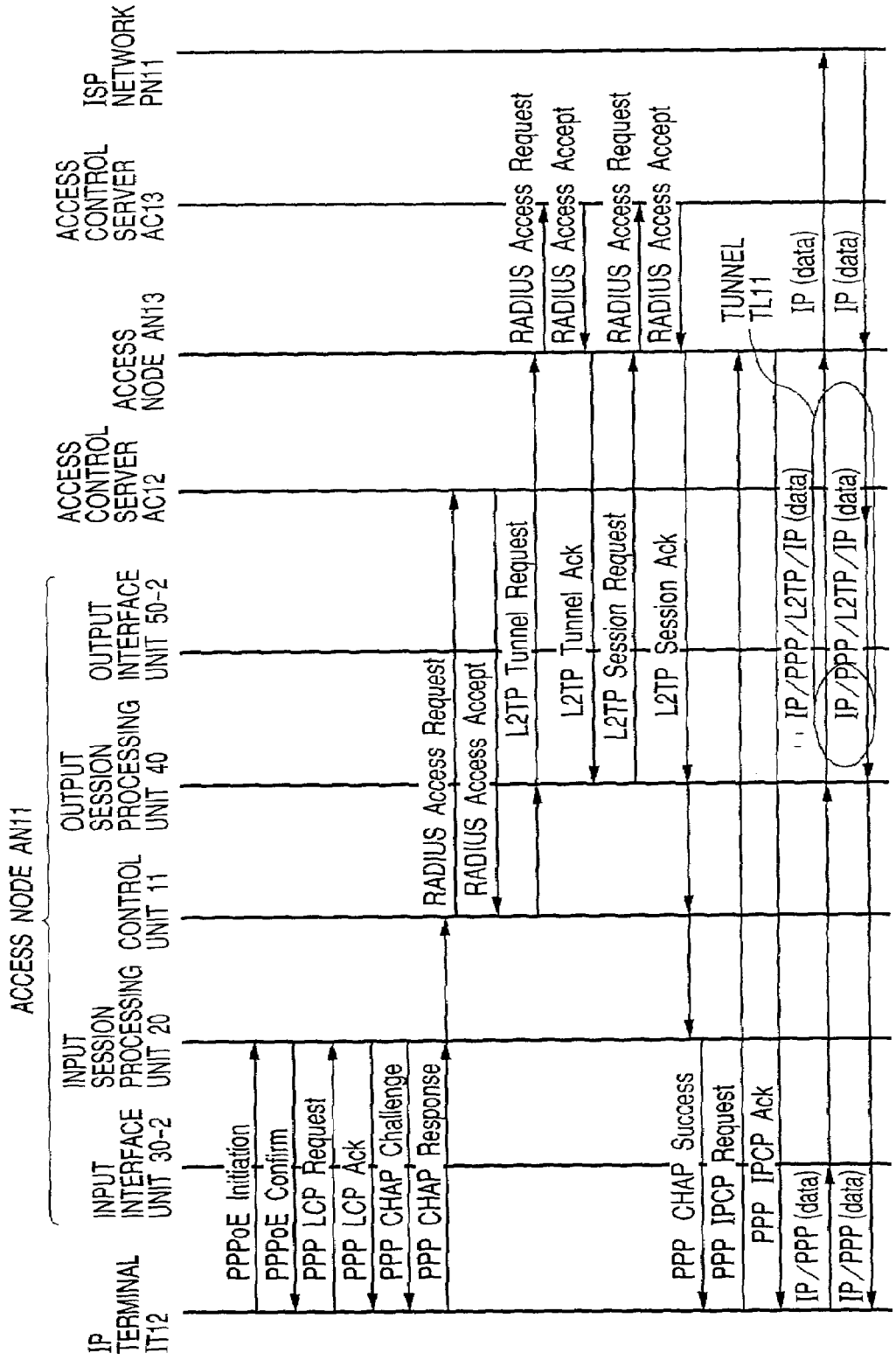
FIG. 5 is a sequence diagram for explaining an example of setting up a session and tunnel for carrying out the high-speed IP connection service in Embodiment 1 of the invention.

Again, refer to the topology of networks shown in FIG. 1 and assume that PPP session PS1 from an IP terminal IT12 over a DSL network MN12 to the ISP network PN11 is now going to be set up in high-speed IP connection mode. With reference to a sequence diagram shown in FIG. 5, the procedure for setting up the object PPP session and L2TP tunnel and session will be explained below. In the following explanation of the sequence diagram, to simplify the explanation, all protocol messages including their names will not be exactly mentioned and some processing such as accounting will be omitted. From the IP terminal IT21, first, an initialization message frame in compliance with PPP over Ethernet (PPPoE) specified in RFC2516 is sent to the access node AN11. This is required for multiple identification of a PPP frame on the Ethernet with the PPP session being set up. In the case of an ADSL network, the PPPoE frame may be further carried across an ATM transmission path; in this case, the frame may be called a PPPOE on ATM (PPPoEoA) frame. PPPOE initialization processing is carried out by, for example, the input session processing unit 20 of the AN11. The PPPOE initialization processing is not necessary when PPP over ATM (PPPoA) specified in RFC2364 is applied. Then, PPP protocol signal processing begins. First, Link Control Protocol (LCP) processing is performed and a link layer is set. Next, processing based on a Challenge Handshake Authentication Protocol (CHAP) specified in RFC1991 is performed. Using a Radius protocol specified in RFC2865 or the like, then, the control unit 11 of the AN11 accesses the access control server AC12 and obtains LNS information, L2TP tunnel information, etc. Now that request is IP connection to the ISP network PN11, the AN11 issues a request to set up an L2TP tunnel to the access node AN 13 that functions as the LNS if that tunnel is not set up. Based on the request and related information, the AN13 queries the access control server AC13 for the ISP network PN11 whether the L2TP tunnel should be set up. If the AC13 accepts, the AN13 returns the acknowledgment to the AN11, then the L2TP tunnel TL11 is set up between the AN11 and the AN13. Next, a session within the L2TP tunnel, corresponding to the object PPP session, is set up by following the similar procedure. During this procedure, user ID and password are transferred from the AN13 to the AC13 where user authentication is performed. When user authentication has been verified, then, setting up the L2TP session is complete and the CHAP related processing also finishes. Next, based on an IP Control Protocol (IPCP) specified in RFC 1332, IP layer setting is performed. When the IP layer has been set, the session setup procedure by protocol signal processing finishes. Then, the PPP session PS 1 from the IT12 to the AN 13 is set up through the tunnel TL11 between the AN 11 and the AN13. After that, data packets will be transmitted through this session.

Once the PPP session PS1 has been set up, the input versus output relation for the session is set to the table on the access node AN11; exemplary entries thereof are given on the entry line 111 in the table shown in FIG. 3. Hereon, the input information consists of the input port and input session identifier for the session without input tunnel identifier information. As the output information, all entries of output port, output tunnel identifier and output session identifier are set. Moreover, the input versus output relation for the session is set to the table on the access node AN13; exemplary entries thereof are given on the entry line 121 in the table shown in FIG. 4. Hereon, all entries of input port, input tunnel identifier and input session identifier are set as the input information, whereas only the output port is set as the output information, but the output tunnel identifier and output session identifier are not set. Now that the input versus output regarding the session have been set in the tables on the nodes as above, when either node receives a data packet of the session after that, it forwards the packet by referring to its table, looking up the set of input information for the session, and obtaining the associated output information. While Embodiment 1 in the example case of DSL access using PPPoEoA has been explained above, that is also true for access over Ethernet instead of the ATM line by using PPPOE.

Figure 6:
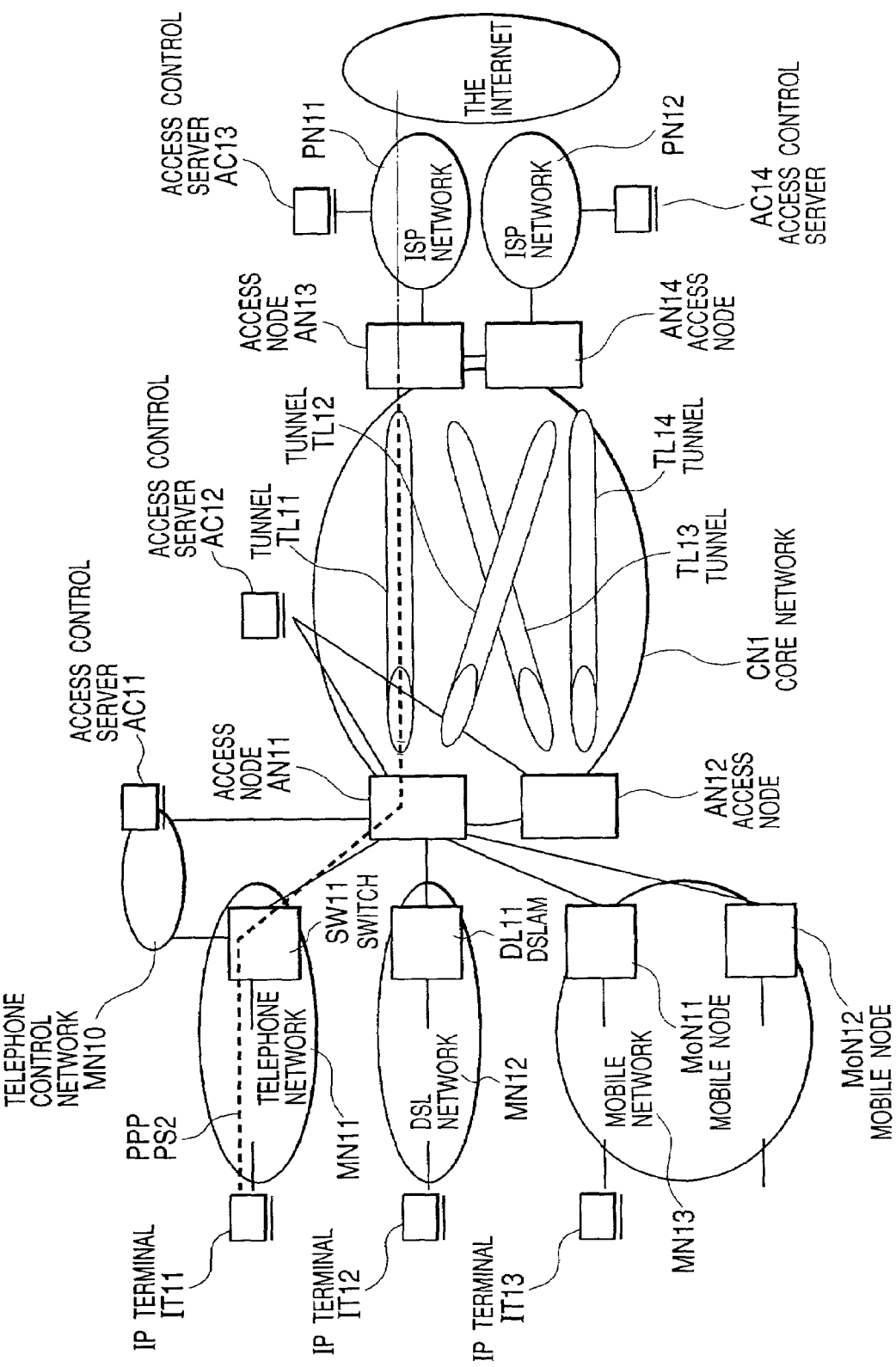
FIG. 6 shows the topology of networks and access nodes for Embodiment 1 wherein a session and tunnel for a relatively low-speed IP connection service are marked.
Figure 7:
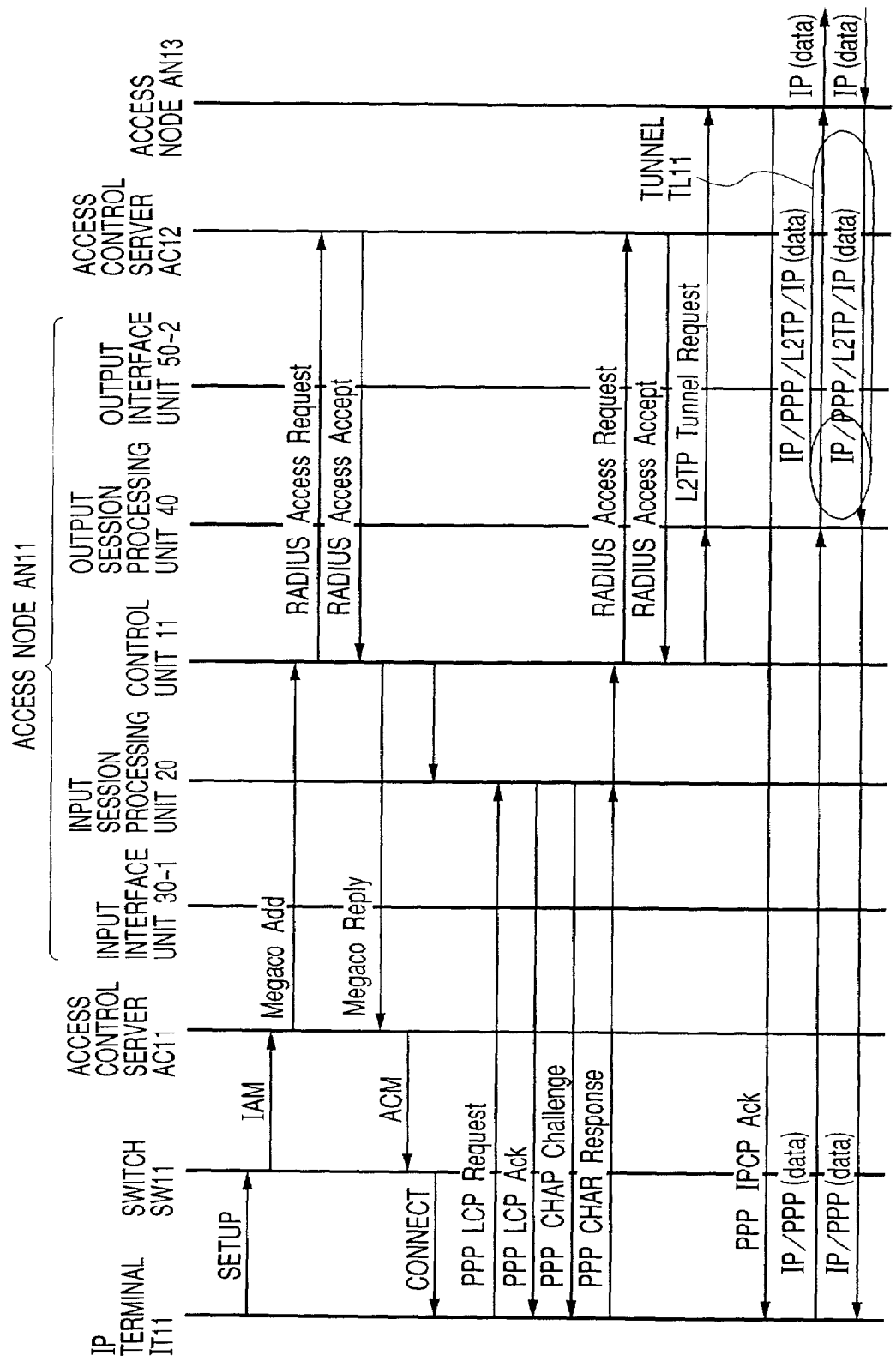
FIG. 7 is a sequence diagram for explaining an example of setting up a session and tunnel for carrying out the relatively low-speed IP connection service in Embodiment 1 of the invention.

Then, refer to FIG. 6 and assume that PPP session PS2 from an IP terminal IT11 over a telephone network MN11 to the ISP network PN11 is now going to be set up in relatively low-speed IP connection mode as indicated by a broken line in FIG. 6. With reference to a sequence diagram shown in FIG. 7, the procedure for setting up the object PPP session and L2TP tunnel and session will be explained below. First, the IP terminal IT11 attempts a call for connection request by dialup. When a switch SW11 receives the attempted call, which is considered as a connection request message, transmitted over the telephone network MN11, it transfers the call to an access control server AC11 across a telephone control network MN10. Using a protocol such as Megaco specified in RFC2885, the server AC11 activates the control unit 11 of the access node AN11. The access node AN11 performs the authentication of source and destination numbers of the call by using Radius and returns a Megaco reply. The reply message of call connection is then returned via the switch SW11 to the terminal IT11 and call connection is completed. Next, PPP protocol signal processing begins. Because its procedure is the same for the above-described case of high-speed IP connection mode, its explanation will not be repeated. As implied in FIG. 1 and FIG. 6, an L2TP tunnel between the AN11 and AN13 is provided by using the existing TL11 tunnel, that is, the common tunnel is used for high-speed IP connection service and for relatively low-speed one if possible. Otherwise, an L2TP tunnel is set up separately from the tunnel for high-speed IP connection service. Once the PPP session PS2 has been set up, the input versus output relation for the session is set to the table on the access node AN11; exemplary entries thereof are given on the entry line 112 in the table shown in FIG. 3. The above relation is also set to the table on the access node AN13; exemplary entries thereof are given on the entry line 122 in the table shown in FIG. 4.

Figure 8:
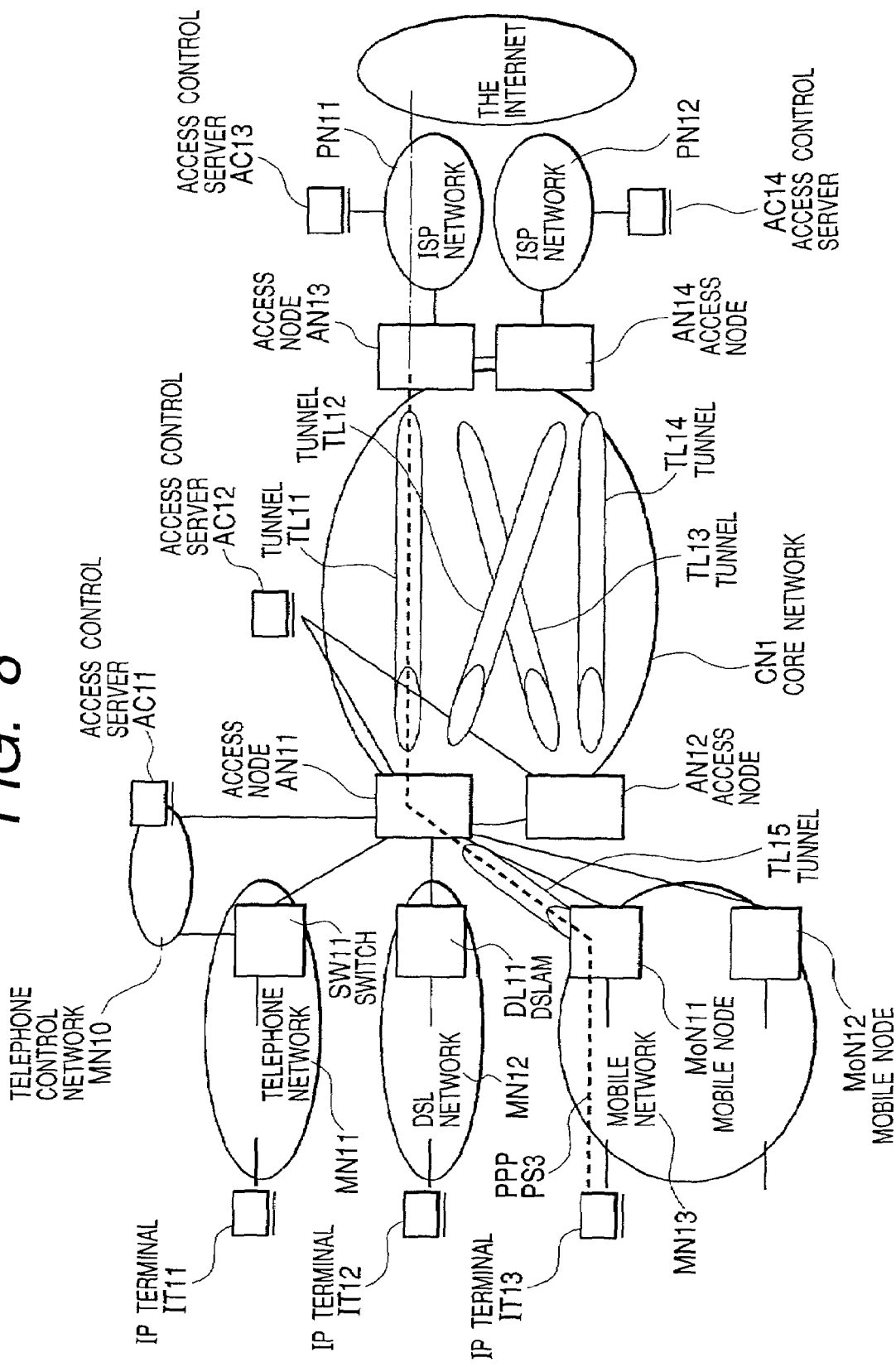
FIG. 8 shows the topology of networks and access nodes for Embodiment 1 wherein a session and tunnels for a mobile network IP connection service are marked.
Figure 9:
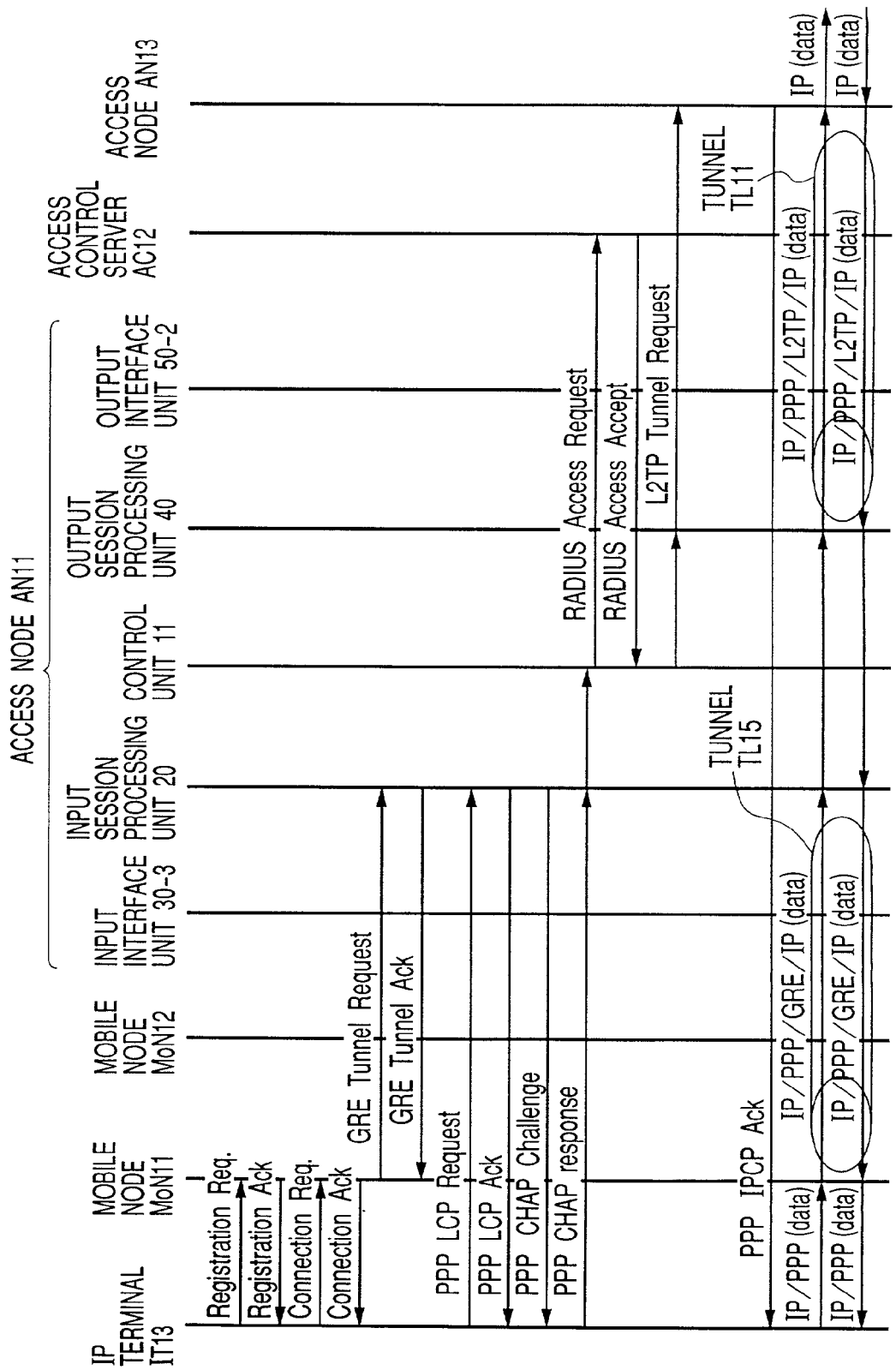
FIG. 9 is a sequence diagram for explaining an example of setting up a session and tunnel for carrying out the mobile network IP connection service in Embodiment 1 of the invention.

Next, refer to FIG. 8 and assume that PPP session PS3 from an IP terminal IT13 over a mobile network MN13 to the ISP network PN11 is now going to be set up in mobile network IP connection mode as indicated by a broken line in FIG. 8. With reference to a sequence diagram shown in FIG. 9, the procedure for setting up the object PPP session and L2TP tunnel and session will be explained below. First, the IP terminal IT13 registers its position with a mobile node MoN11 and related processing thereof is performed on the node. Then, connection setup request is acknowledged. Based on that, a tunnel using GRE or the like is set up between the mobile node MoN11 and the access node AN11. Then, PPP protocol signal processing begins. Because its procedure is the same for the above-described case of high-speed IP connection mode, its explanation will not be repeated. As implied in FIG. 1 and FIG. 8, an L2TP tunnel between the AN11 and AN13 is provided by using the existing TL11 tunnel, that is, the common tunnel is used for high-speed IP connection service and for mobile one if possible. Otherwise, an L2TP tunnel is set up separately from the tunnel for high-speed IP connection service. Once the PPP session PS3 has been set up, the input versus output relation for the session is set to the table on the access node AN11; exemplary entries thereof are given on the entry line 113 in the table shown in FIG. 3. The above relation is also set to the table on the access node AN13; exemplary entries thereof are given on the entry line 123 in the table shown in FIG. 4.

Figure 10:
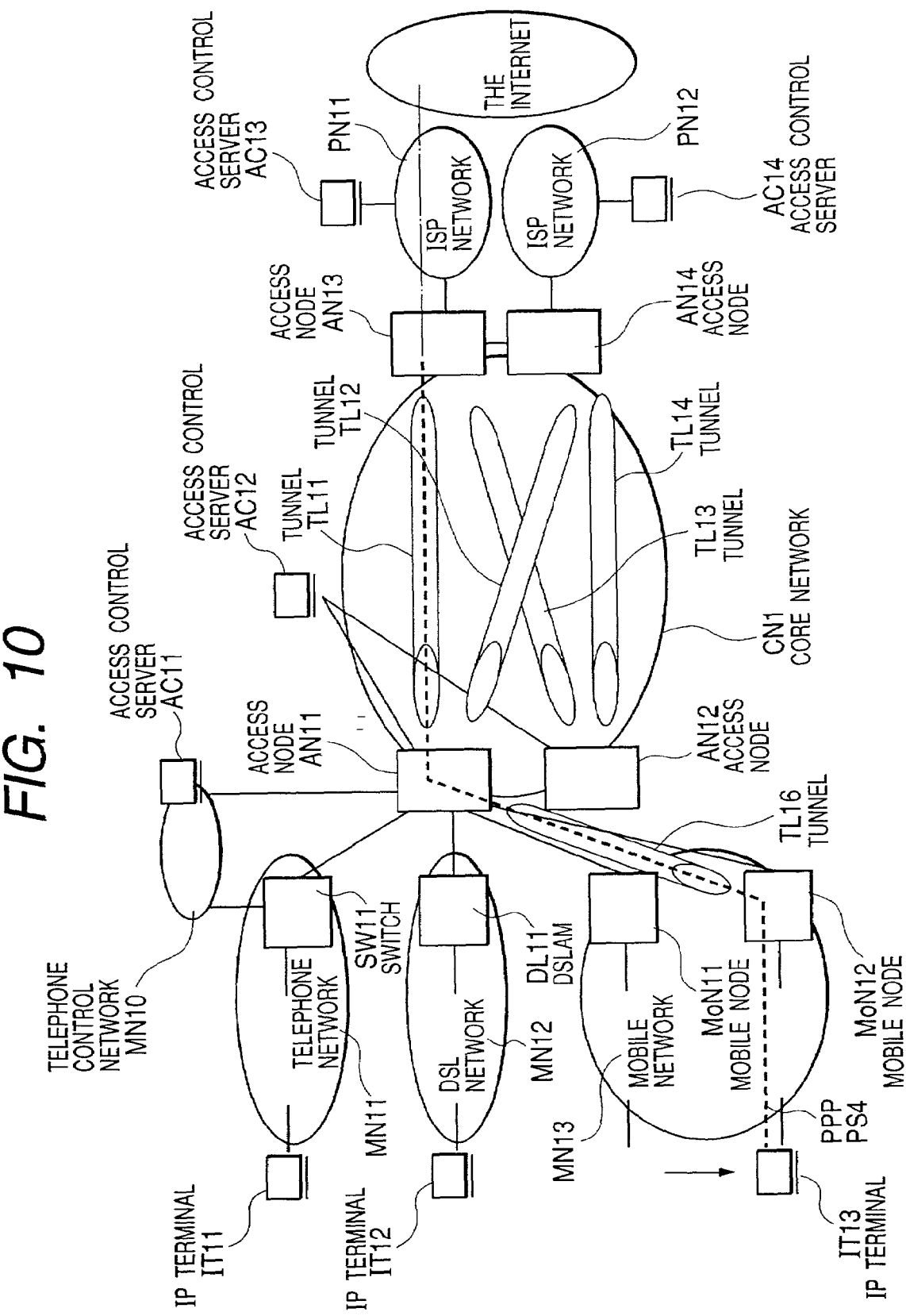
FIG. 10 shows the topology of networks and access nodes for Embodiment 1 wherein a session and tunnels are marked which are to be set up when a terminal moves such that it is handed over from a mobile node to another mobile node in the mobile network IP connection service mode.
Figure 11:
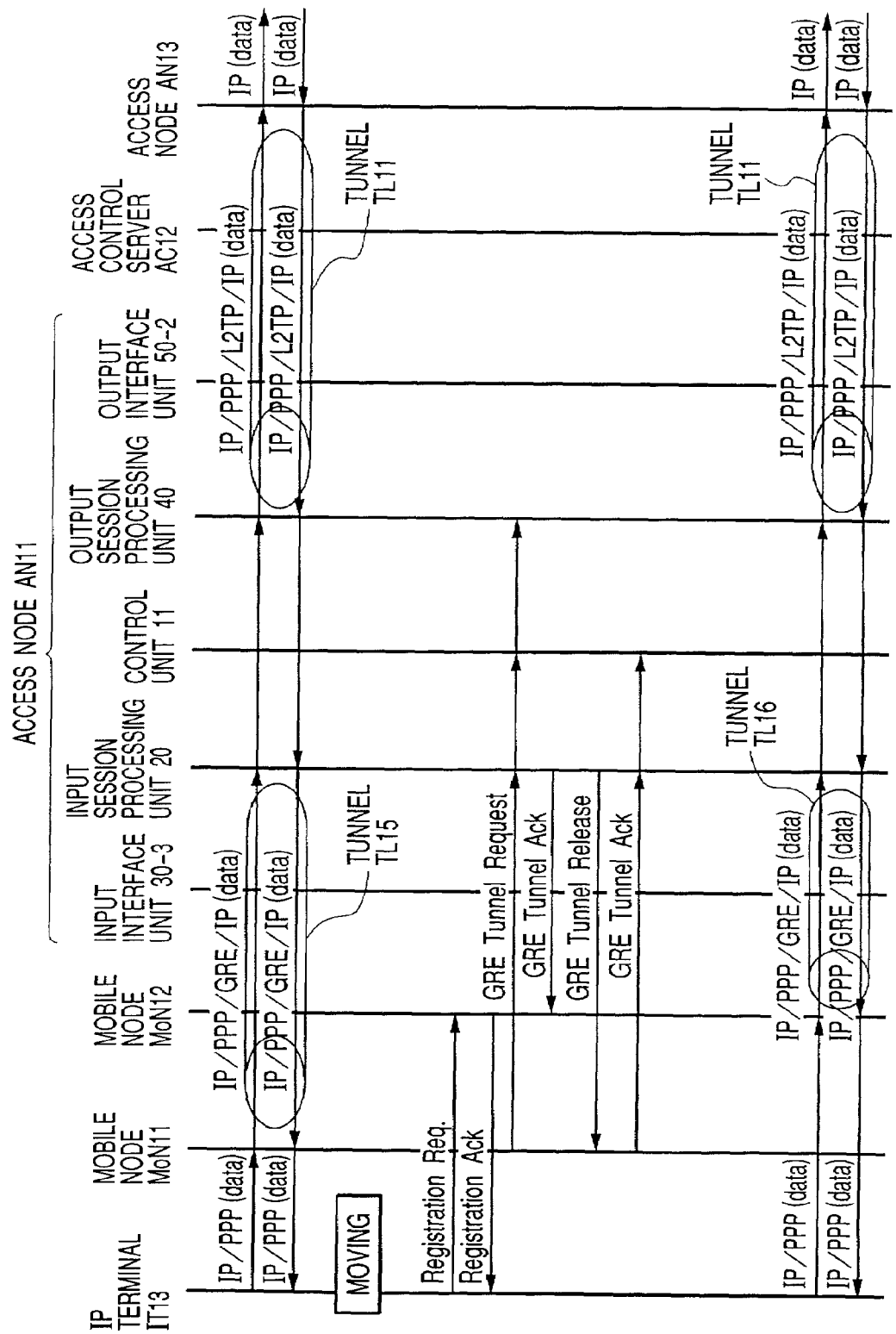
FIG. 11 is a sequence diagram for explaining an example of setting up a session and tunnels when a terminal moves such that it is handed over from a mobile node to another mobile node in the mobile network IP connection service mode in Embodiment 1 of the invention.

Next, refer to FIG. 10 and assume that the IP terminal IT13 in the mobile network MN13 leaves the area covered by the mobile node MoN11 and enters the area covered by a mobile node MoN12 and a new PPP session PS4 is now going to be set up. This case will be explained below, with reference to a sequence diagram shown in FIG. 11. First, the IP terminal IT 13 registers again its position with the mobile node MoN12 and related processing thereof is performed on the mode. Based on that, a new tunnel using GRE or the like is set up between the mobile node MoN12 and the access node AN11. On the access node AN11, the input versus output relation for the new session is set to its table; exemplary entries thereof are given on the entry line 114 in the table shown in FIG. 3. Hereon, the new session PS4 inherits the information for the PPP session PS3. At this time, the table on the access node AN 13 does not change with the entries set on the entry line 123 in the table shown in FIG. 4 remaining as is. The GRE tunnel set up between the mobile node MoN11 and the access node AN11 becomes unnecessary and released. The entry line 113 in the table shown in FIG. 3 could be deleted from the table; in fact, it is deleted.

By using the same way of hand-over as for the above-described case where the PPP session PS4 shown in FIG. 10 is set, inheriting the information for the PPP session PS3 shown in FIG. 8, such a service is also conceivable that, for example, the PPP session PS 4 is set, inheriting the information for the PPP session PS1 shown in FIG. 1. For example, when the terminal IT 12 connected to the DSL network keeps in the session of IP-based connection to the ISP network PN11, the input versus and output relation for the session is set in the table on the access node AN11 as the entries given on the entry line 111 shown in FIG. 3. Data transmission is performed as represented by data flow at the lowest position in FIG. 5. Given that this terminal IT12 moves and enters the mobile network MN13 and comes to the same position as the position of the terminal IT13 shown in FIG. 10, a session hand-over takes place by using a GRE tunnel corresponding to the tunnel TL16 through the same procedure as for the sequence shown in FIG. 11 except for the procedure of releasing the previously set up GRE tunnel. At this time, in the table shown in FIG. 3, entries on the entry line 114 are set, inheriting those on the entry line 111 (the output identifiers on the entry line 114 remain the same as those on the entry line 111). In addition to the session hand-over for a terminal moving within the mobile network, a session hand-over service from a fixed network such as the DSL network to a mobile network is feasible in the manner described above.

Figure 12:
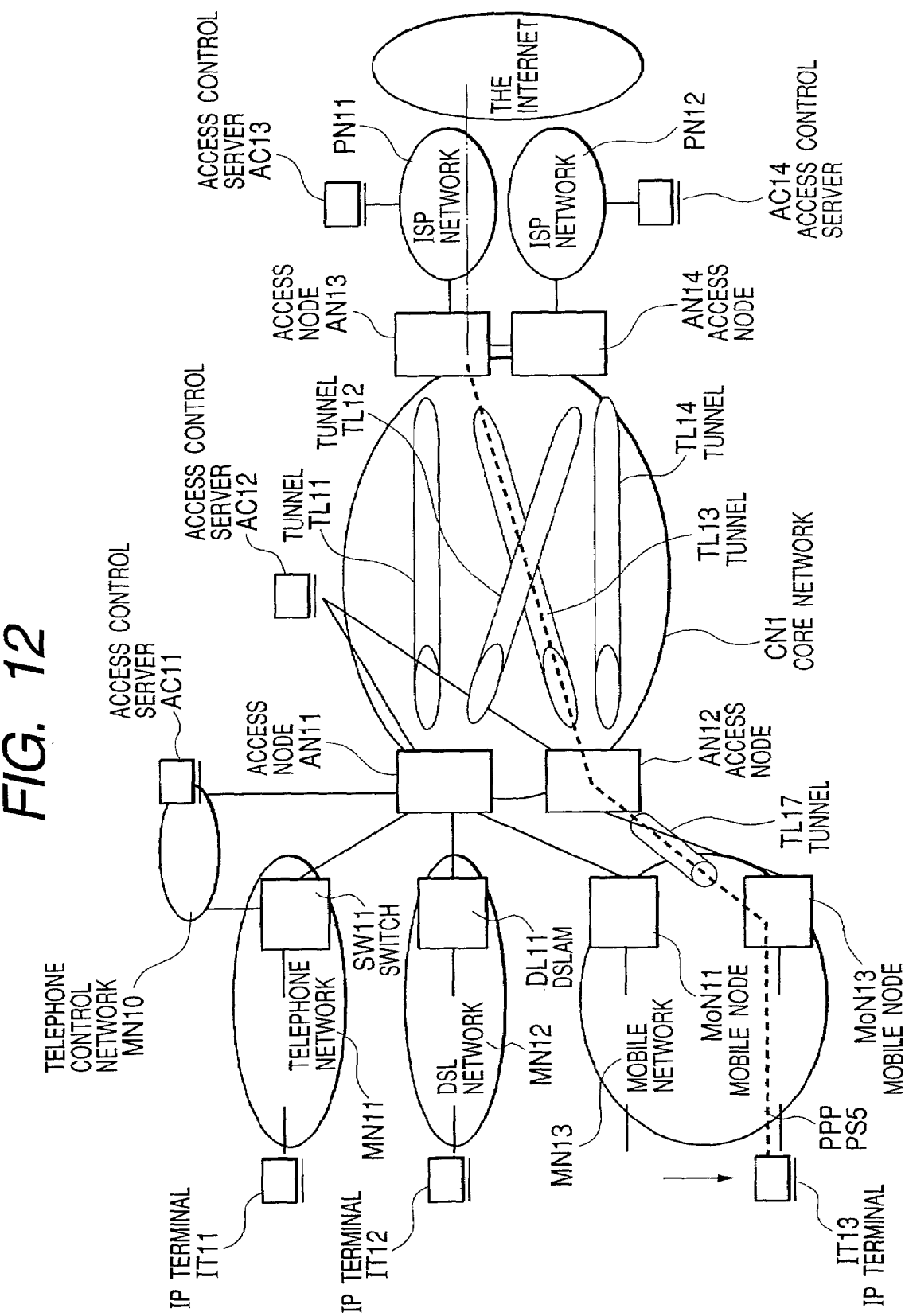
FIG. 12 shows the topology of networks and access nodes for Embodiment 1 wherein a session and tunnels are marked which are to be set up when a terminal moves such that it is handed over from an access node to another access node in the mobile network IP connection service mode.

Next, refer to FIG. 12 and assume that the IP terminal IT13 in the mobile network MN13 leaves the area covered by the mobile node MoN11 and enters the area covered by a mobile node MoN13 and a new PPP session PS5 is now going to be set up. Because the mobile node MoN11 is connected to the access node AN11 and the mobile node MoN13 is connected to another access node AN12, in a method of setting up a session in the case of L2TP, when the tunnel is changed from TL11 to TL13, the PPP session PS3 should be disconnected and a new PPP session PS5 set up. If tunnels based on Mobile IP specified in RFC2002 or the like, instead of L2TP, are used, switching from the TL11 tunnel to TL13 tunnel without disconnecting the PPP session is possible with the viewpoint centered on the access node AN13. In either case, the input versus output relation for the PPP session PS5 is set to the table on the access node AN12; exemplary entries thereof are given on the entry line 131 in the table shown in FIG. 13. The above relation is also set to the table on the access node AN13; exemplary entries thereof are given on the entry line 143 in the table shown in FIG. 14.

By using the common table and hardware for routing and setting different information sets to the table for different access methods and network services in the above-described manner, an apparatus serving the needs of packet switching for diverse IP connection services is provided at a packet switching node. Thus, the present embodiment makes it possible to cut down the apparatus/equipment setup cost and management cost and carry out centralized management. According to the present embodiment, upgrades to advanced network services and the operation of existing services and advanced services are easily implemented; e.g., upgrading from the relatively low-speed IP connection service to the high-speed IP connection service, the operation of both services during a gradual transition period, and adding a mobile network IP connection service.

A preferred Embodiment 2 of the present invention will be described below, with reference to the attached drawings.

Figure 15:
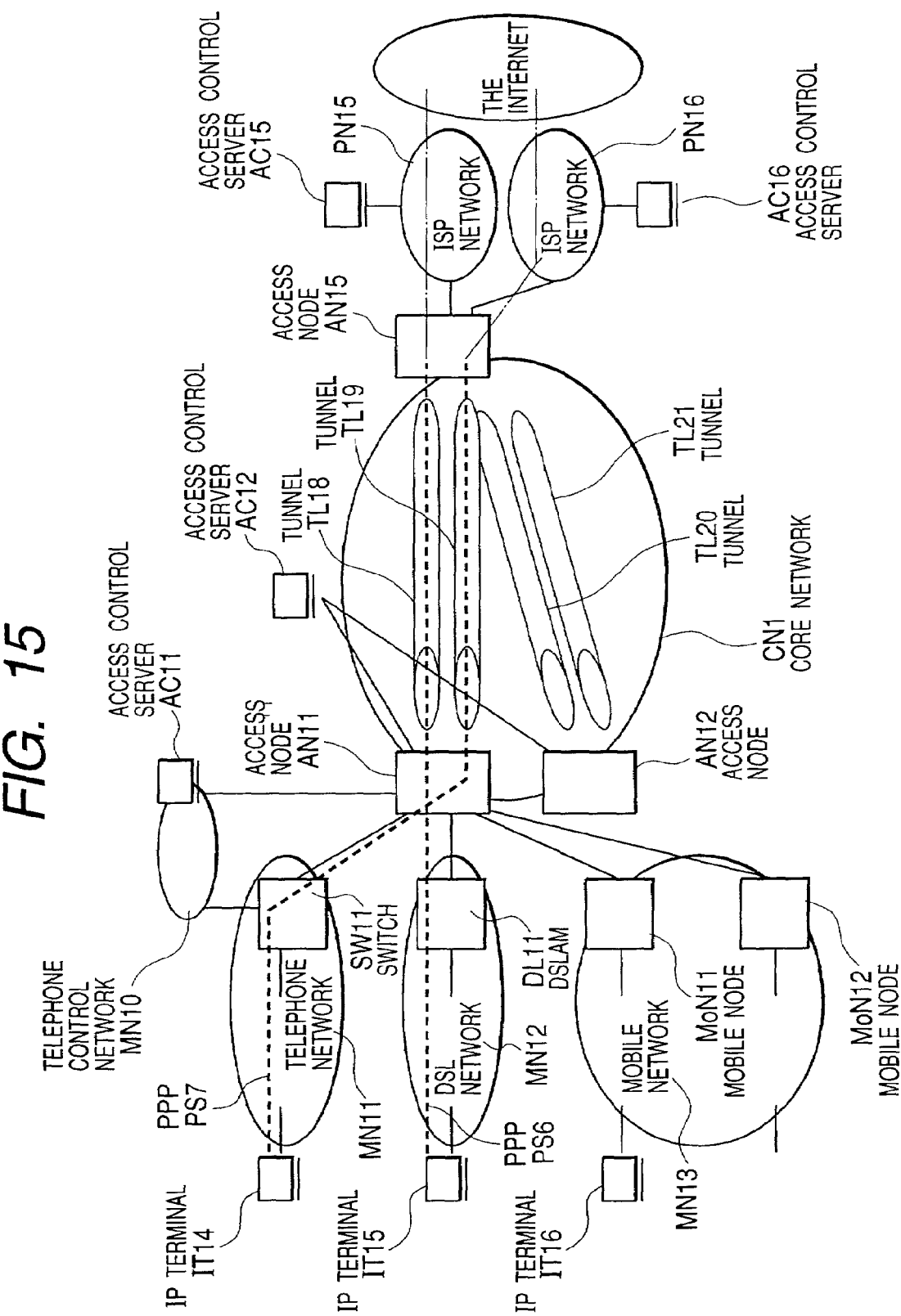
FIG. 15 shows an illustrative topology for a preferred Embodiment 2 of the present invention, organized with networks and access nodes including the networks respectively providing a relatively low-speed IP connection service, a high-speed IP connection service, and a mobile network IP connection service, wherein a common access node (packet switching apparatus) serves a plurality of ISP networks.

FIG. 15 shows an illustrative topology for Embodiment 2, organized with networks and access nodes including the networks respectively providing a relatively low-speed IP connection service, a high-speed IP connection service, and a mobile network IP connection service, which is similar to FIG. 1. Access nodes AN11 and AN12 that function as the LACs are located in the same positions as in FIG. 1, however, an access node AN15 that functions as the LNS is located so as to be common for a plurality of ISP networks PN15 and PN16. In the topology of networks shown in FIG. 15, assume that PPP session PS6 is set up from an IP terminal IT15 over the DSL network MN12 to the ISP network PN15 in high-speed IP connection mode and that PPP session PS7 is set up from an IP terminal IT14 over the telephone network MM 11 to the ISP network PN16 in relatively low-speed IP connection mode. In the network topology shown in FIG. 1 where separate access nodes for the ISP networks are located, the session corresponding to the PS6 session is set up to pass through the tunnel TL11 and the session corresponding to the PS7 session is set up to pass through the tunnel TL12. On the other hand, in the network topology shown in FIG. 15, the PPP session PS6 is set up to pass through a tunnel TL18 and the PS7 is set to pass through a tunnel TL19.

The pathfinding information, namely, the input and output relations for the PPP sessions PS6 and PS7 are set to the table on the access node AN11; exemplary entries thereof are given on the entry lines 151 and 152, respectively, in the table shown in FIG. 16. The above relations are also set to the table on the access node AN15; exemplary entries thereof are given on the entry lines 161 and 162, respectively, in the table shown in FIG. 17. Provided that the PPP sessions PS1 and PS2 have already been set up from the terminals IT12 and IT11 to the ISP network PN11 as shown FIGS. 1 and 6, an input session identifier of 1 is already used for the input ports 32 and 31 of the access node AN11 as given on the entry lines 111 and 112 in FIG. 3. To distinguish the sessions PS6 and PS7 from the sessions PS1 and PS2, thus, an input session identifier of 2 is used on the entry lines 151 and 152 in FIG. 16. The same output port 51 is used for the PPP sessions PS6 and PS7, but different output tunnel identifiers TL18 and TL19 are set respectively for the sessions. In FIG. 17, different output ports are set, indicating diverging routes of data traffic; one toward the ISP network PN15 and the other toward the ISP network PN16. By applying the present invention to a plurality of ISP networks such as the ISP networks PN15 and PN16 or corporate networks in the manner described above, the access node AN15 operates as a single virtual router for virtually fulfilling the functions of a plurality of switching equipments. This access node of Embodiment 2, similarly, can implement offering diverse network services for a plurality of access methods. The above-described embodiment is also true for mobile network IP connection mode.

Figure 18:
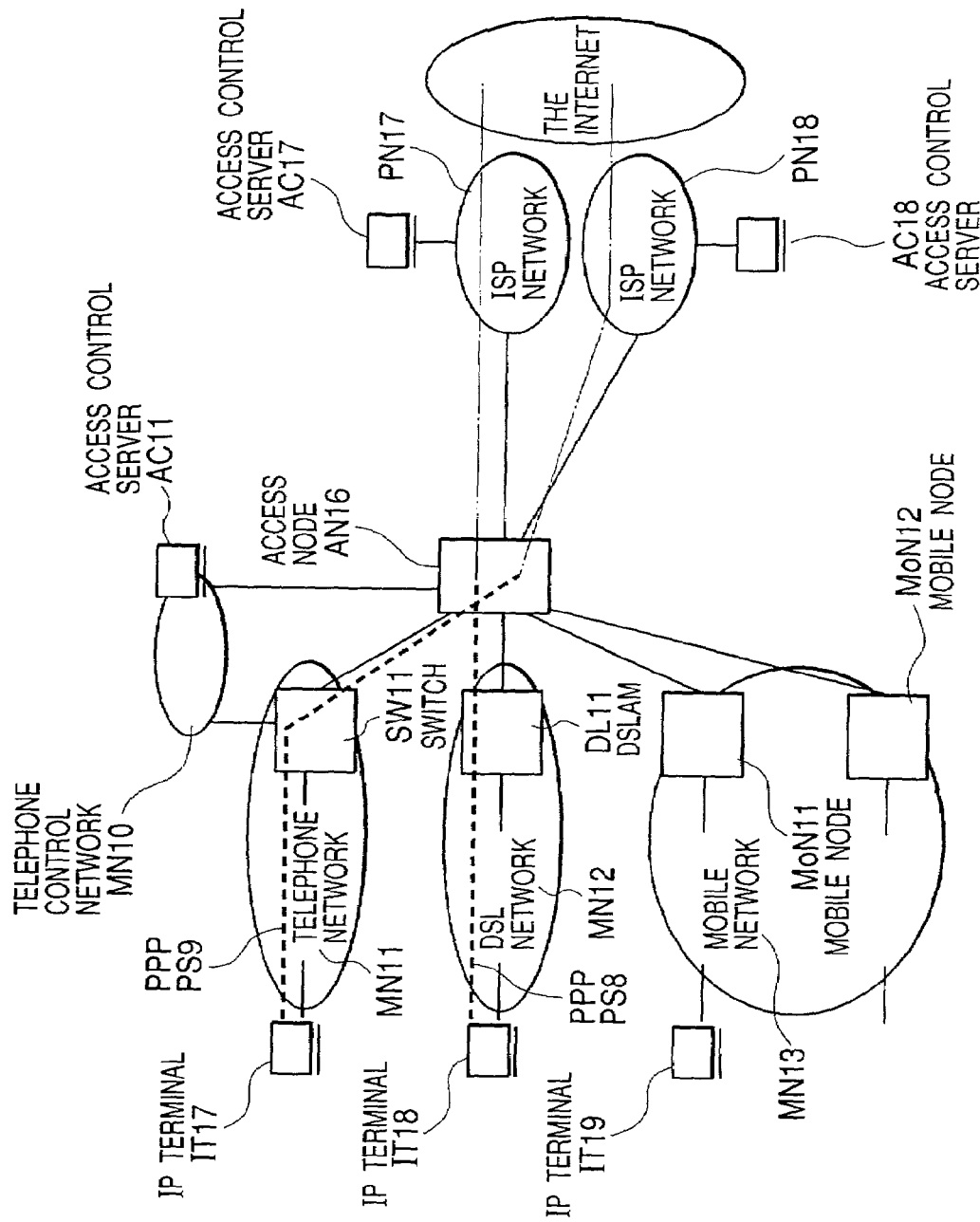
FIG. 18 shows an illustrative topology for a preferred Embodiment 3 of the present invention, organized with networks and access nodes including the networks respectively providing a relatively low-speed IP connection service, a high-speed IP connection service, and a mobile network IP connection service, wherein no tunnels are set up between access nodes.
Figure 20:
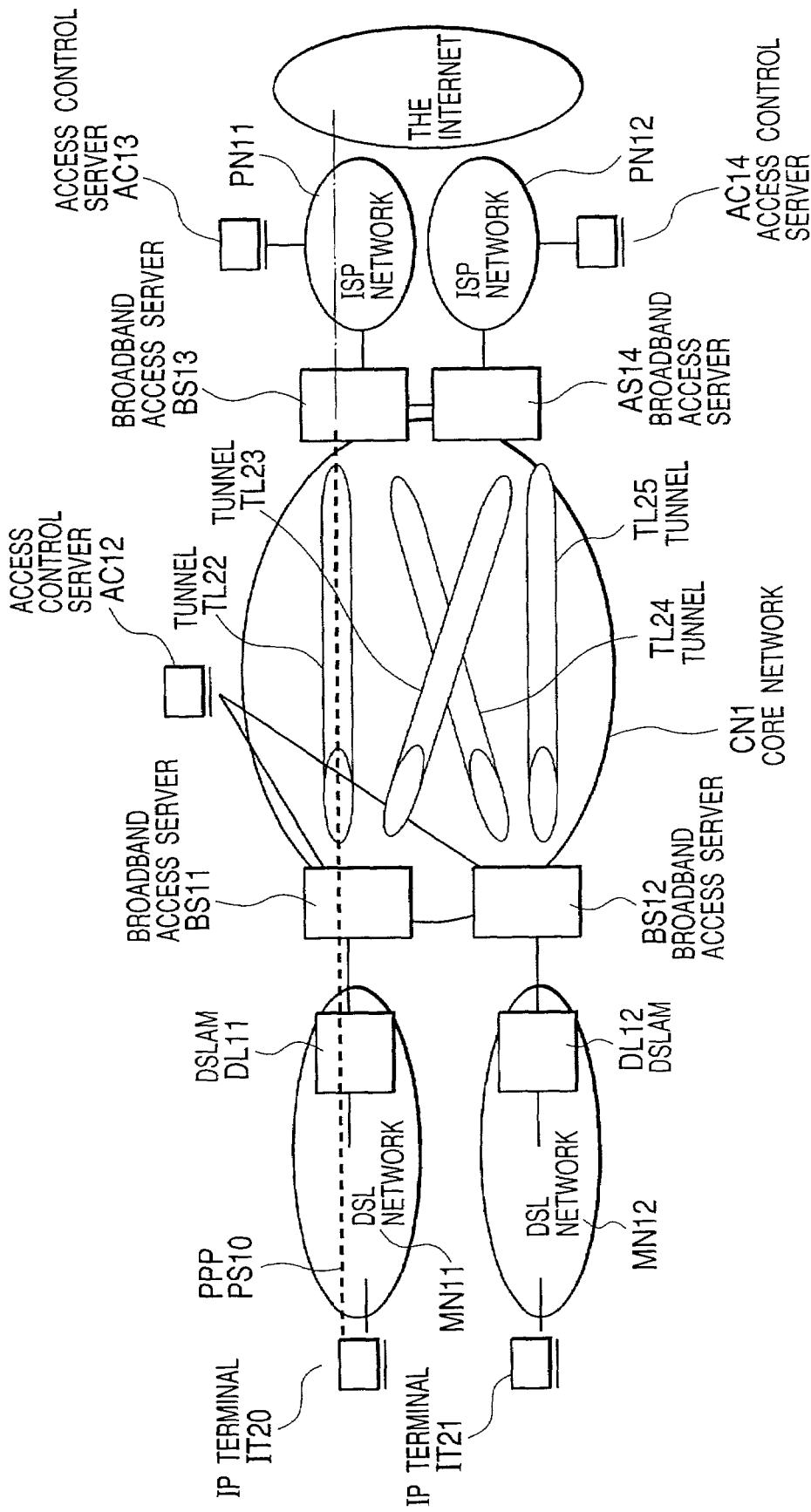
FIG. 20 shows an illustrative topology organized with networks for implementing a high-speed IP connection service by means of conventional high-speed access servers.
Figure 21:
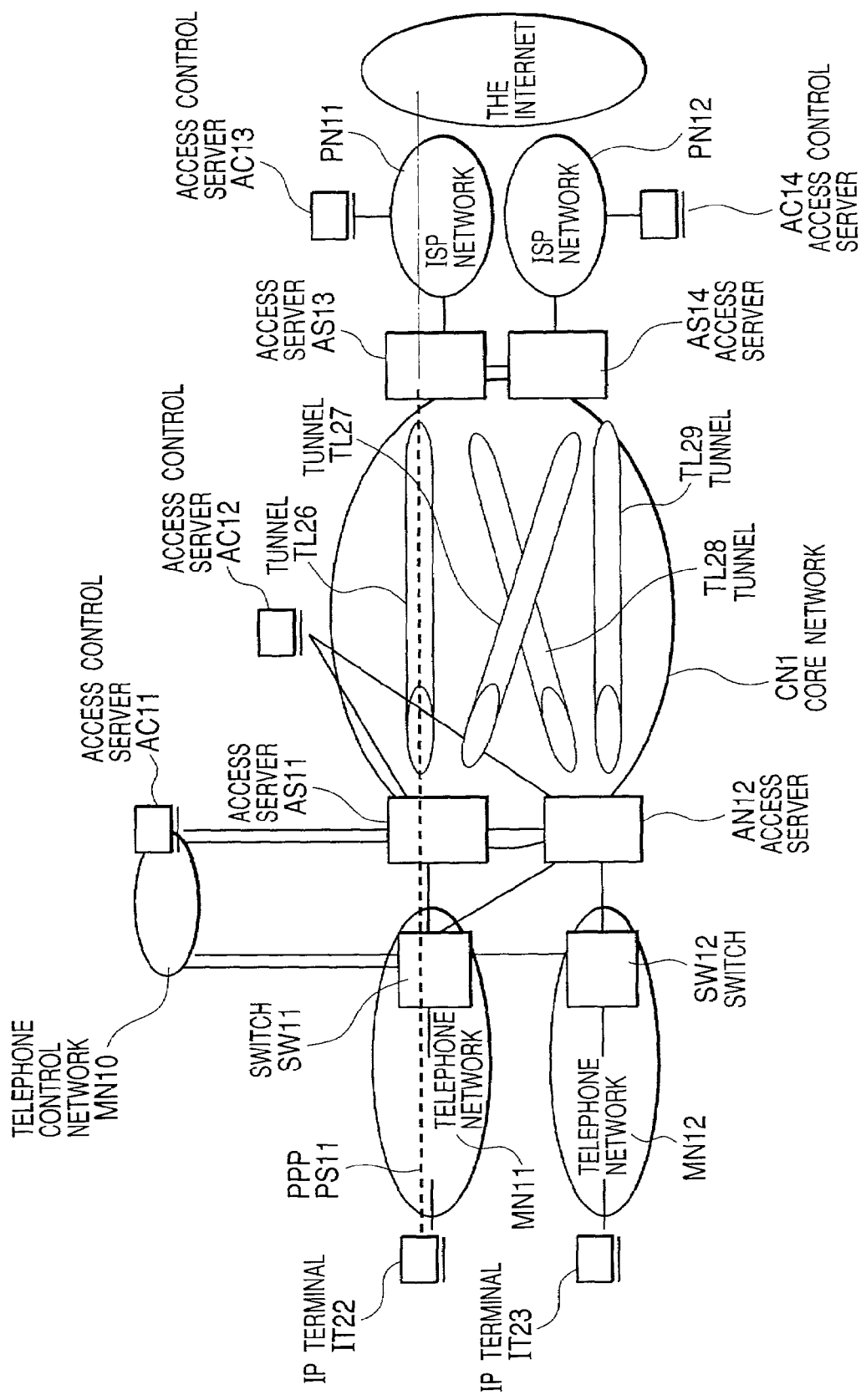
FIG. 21 shows an illustrative topology organized with networks for implementing a relatively low-speed IP connection service by means of conventional access servers.
Figure 22:
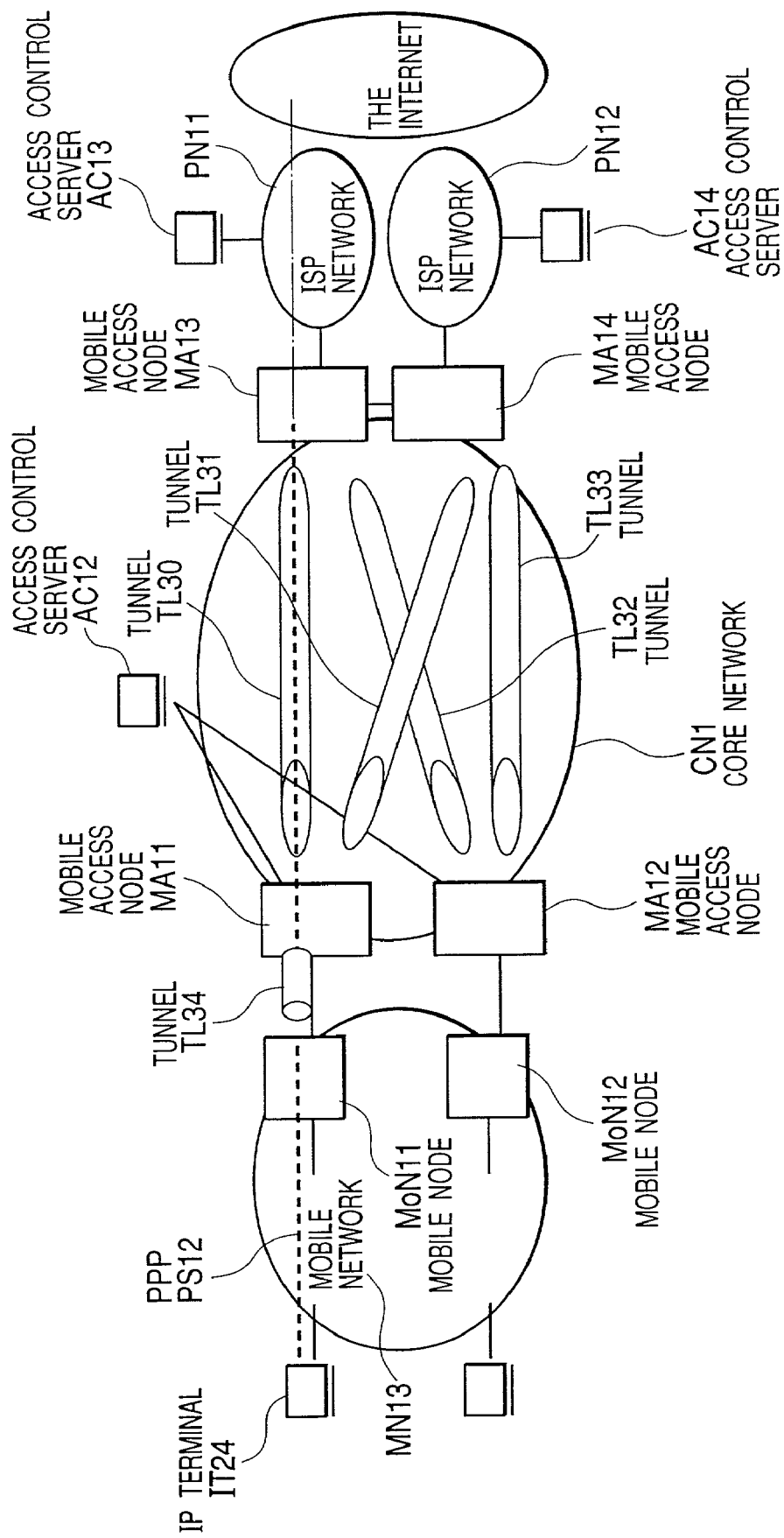
FIG. 22 shows an illustrative topology organized with networks for implementing a mobile network IP connection service by means of conventional mobile access nodes.
Figure 23:
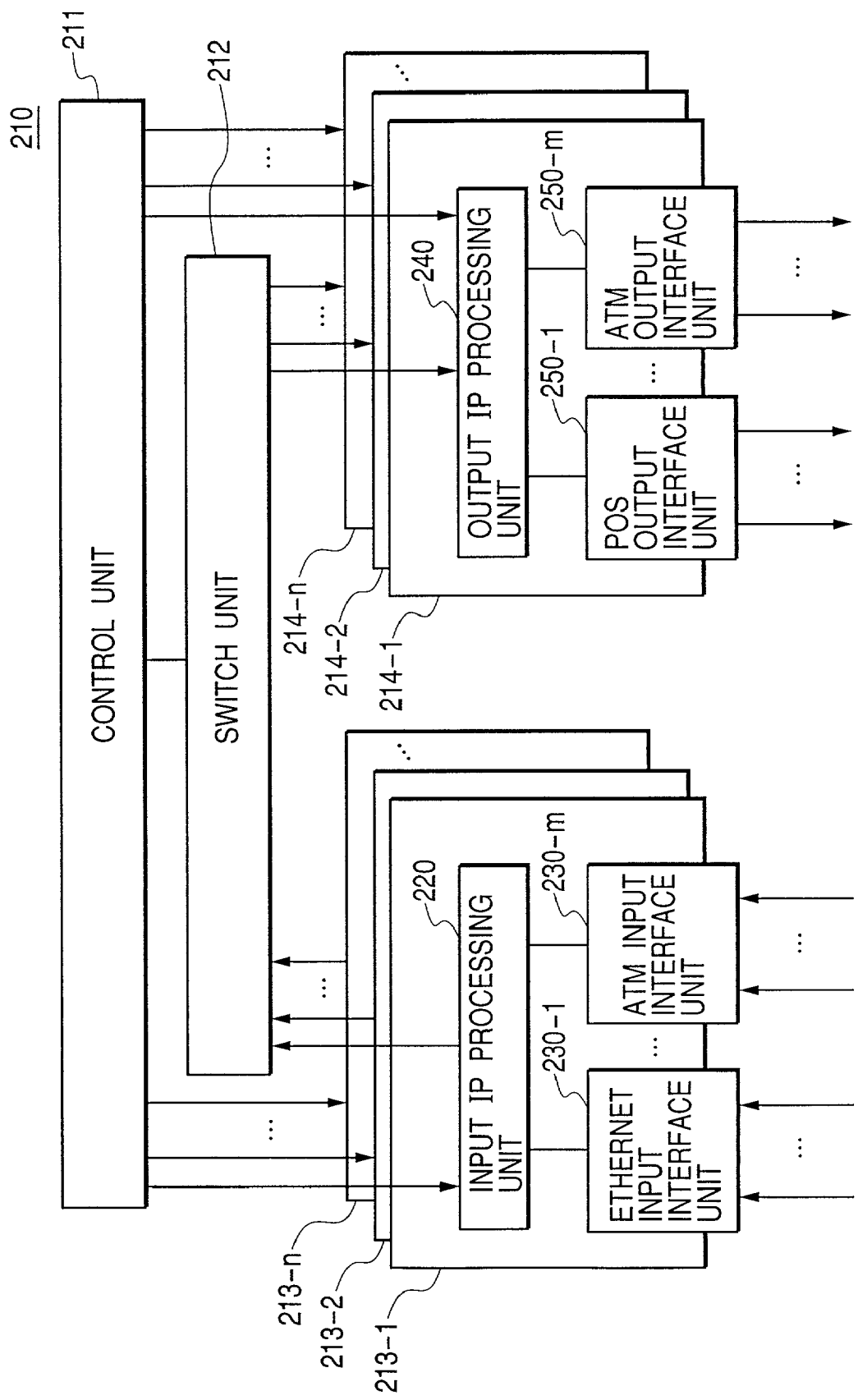
FIG. 23 shows an illustrative hardware configuration of a conventional high-speed IP router.
Figure 24:
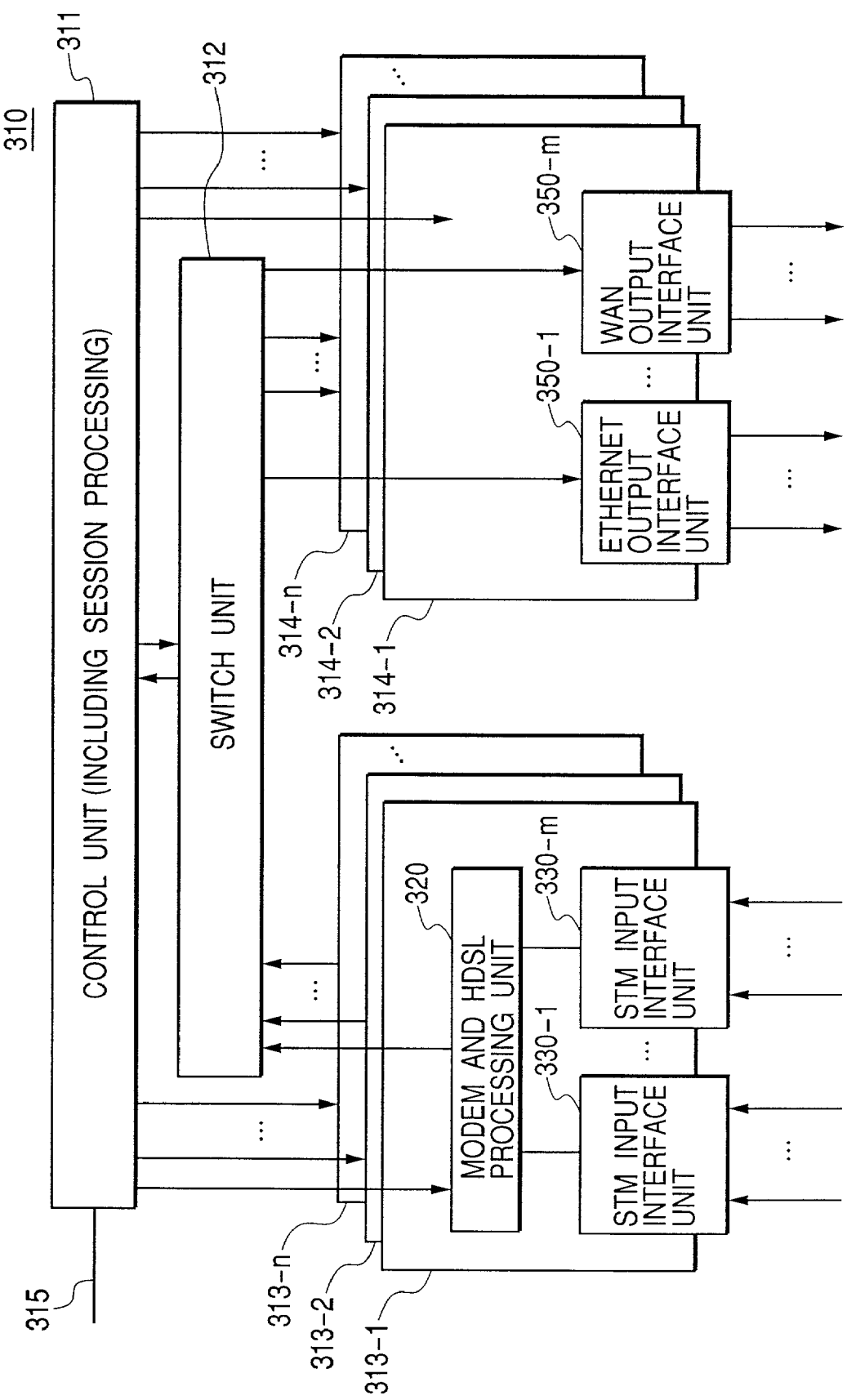
FIG. 24 shows an illustrative hardware configuration of a conventional RAS.

A preferred Embodiment 3 of the present invention will be described below, with reference to the attached drawings FIG. 18 shows an illustrative topology for Embodiment 3, organized with networks and access nodes including the networks respectively providing a relatively low-speed IP connection service, a high-speed IP connection service, and a mobile network IP connection service, which is similar to FIG. 15. The topology shown in FIG. 18 with an access node AN16 that functions as both the LAC and LNS can be regarded as a simpler version of the topology shown in FIG. 15. In the topology with networks shown in FIG. 18, assume that PPP session PS8 is set up from an IP terminal IT18 over the DSL network MN12 to an ISP network PN17 in high-speed IP connection mode and that PPP session PS9 is set up from an IP terminal IT17 over the telephone network MN11 to an ISP network PN18 in relatively low-speed IP connection mode.

The pathfinding information, namely, the input and output relations for the PPP sessions PS8 and PS9 are set to the table on the access node AN16; exemplary entries thereof are given on the entry lines 171 and 172, respectively, in the table shown in FIG. 19. In this case, no tunnels are set up in the area on the right of the AN16 in FIG. 18 and thus nothing is set in the column of output tunnel identifier OUT72 of the above table. An input tunnel identifier IN72 may be set in the case of mobile network IP connection service. Because the topology for Embodiment 3 as shown in FIG. 18 does not include tunnels based on L2TP or the like between access nodes, Embodiment 3 implements networking with the features of faster processing in the phase of protocol signal processing, no tunnel overheads, and higher data transmission efficiency. The access node of Embodiment 3 for this networking, similarly, can implement offering diverse network services for a plurality of access methods.

According to the present embodiments described above, a plurality of network services based on different access methods can be provided; e.g., relatively low-speed IP connection service for access method over a telephone network; high-speed IP connection service for access method over an DSL network, FTTH network, etc.; and mobile network IP connection service for access method over a mobile network. By using the common table and hardware for routing and setting different information sets to the table for different access methods and network services, an apparatus serving the needs of packet switching for diverse IP connection services is provided at a packet switching node. Thus, the present invention makes it possible to cut down the apparatus/equipment setup cost and management cost and carry out centralized management. According to the present invention, upgrades to advanced network services and the operation of existing services and advanced services are easily implemented; e.g., upgrading from the relatively low-speed IP connection service to the high-speed IP connection service, the operation of both services during a gradual transition period, and adding a mobile network IP connection service. For example, a session hand-over service from a fixed network such as a DSL network to a mobile network is feasible, in addition to the session hand-over for a terminal moving within a mobile network. By applying the present invention to a plurality of ISP networks or corporate networks, the packet switching apparatus of the present invention run as the access node for these networks operates as a single virtual router for virtually fulfilling the functions of a plurality of switching equipments. Thus, the packet switching apparatus can implement offering diverse network services for a plurality of access methods. By applying the present invention to the network topology not including tunnels between access nodes, networking is implemented with the features of faster processing in the phase of protocol signal processing, no tunnel overheads, and higher data transmission efficiency. The packet switching apparatus of the present invention run as the access node for this networking can also implement offering diverse network services for a plurality of access methods.

The present invention may be embodied in other specific forms without departing from the spirit or essential characteristics thereof. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within the scope of the claims.

What is claimed is:

1. A packet switching apparatus connected to a plurality of networks, each network using a specific communication protocol for transmitting packets across it, the packet switching apparatus for forwarding packets received to their destination, based on a session as point-to-point connection set up between a terminal and a destination network, and the packet switching apparatus comprising:

a pathfinding table for containing entries on a plurality of entry lines, to which, route information to be known when a first packet of a session is received and associated output information including the identifier of an output port through which to send out the packet received, the identifier of an output tunnel including one session or a bundle of a plurality of sessions through which packets are logically passed to a point in a network, and the identifier of an output session are defined; and a processing unit for packets received which searches said pathfinding table for an entry line matching with the route information included in a packet received, performs processing for the received packet, according to packet output route information specified on the searched out entry line, and sends out the received packet through the output port identified by the output port identifier on said specific entry line, and wherein:

even when the terminal moves, leaving the area of a network and entering the area of another network among said plurality of networks, said packet switching apparatus continues to forward packets it received through the existing point-to-point session handed over to the network where the terminal now stays only by changing the output tunnel including one session or a bundle of a plurality of sessions through which packets are logically passed to a point in a network, wherein each of the entries of the pathfinding table contains a correspondence among an identifier of an input tunnel of an input packet, an identifier of an input session of the input packet, and an identifier of an output port of the input packet.

2. The packet switching apparatus according to claim 1, wherein said apparatus handles packets to be transmitted through said session or sessions based on a Point to Point Protocol (PPP).

3. The packet switching apparatus according to claim 1, wherein said apparatus handles packets to be transported through output tunneling based on a Layer 2 Tunneling Protocol (L2TP).

4. The packet switching apparatus according to claim 1, wherein said apparatus handles packets to be transported through output tunneling based on a Mobile IP.

* * * * *